United States Patent

Bullens et al.

(10) Patent No.: US 12,478,435 B2
(45) Date of Patent: Nov. 25, 2025

(54) ASSISTING IN MOVING AN INSERTION ELEMENT WITHIN AN OBJECT

(71) Applicant: KONINKLIJKE PHILIPS N.V., Eindhoven (NL)

(72) Inventors: Roland Wilhelmus Maria Bullens, Mierlo (NL); Wilhelmus Henrica Gerarda Maria Van Den Boomen, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 202 days.

(21) Appl. No.: 17/296,264

(22) PCT Filed: Jan. 17, 2020

(86) PCT No.: PCT/EP2020/051141
§ 371 (c)(1),
(2) Date: May 24, 2021

(87) PCT Pub. No.: WO2020/152051
PCT Pub. Date: Jul. 30, 2020

(65) Prior Publication Data
US 2022/0096162 A1 Mar. 31, 2022

(30) Foreign Application Priority Data
Jan. 21, 2019 (EP) .................................... 19152842

(51) Int. Cl.
*A61B 34/20* (2016.01)
*A61B 90/00* (2016.01)
*G02B 6/02* (2006.01)

(52) U.S. Cl.
CPC .............. *A61B 34/20* (2016.02); *A61B 90/37* (2016.02); *G02B 6/02042* (2013.01); *A61B 2034/2061* (2016.02)

(58) Field of Classification Search
CPC . A61B 2034/2061; A61B 34/20; A61B 90/37; G02B 6/02042
See application file for complete search history.

(56) References Cited

U.S. PATENT DOCUMENTS 7,772,541 B2   8/2010   Froggatt
8,116,601 B2   2/2012   Prisco
(Continued)

FOREIGN PATENT DOCUMENTS

WO   2014/191262   12/2014
WO   2015/023665   2/2015
(Continued)

OTHER PUBLICATIONS

International Search Report and Written Opinion Dated Apr. 23, 2020 for International Application No. PCT/EP2020/051141 Filed Jan. 17, 2020.

*Primary Examiner* — Michael T Rozanski

(57) ABSTRACT

The invention relates to assisting a user in moving an insertion element within an object. A three-dimensional (3D) position and 3D local shape of the insertion element are tracked within the object. Based on the tracked 3D position and 3D local shape of the insertion element, an insertion element representation (42''') representing the insertion element within the object in its 3D position and 3D local shape is generated. Furthermore at least two different markings (78) applied along the length of the insertion element representation (42''') representing indications of the local shape of the insertion element are provided. A display image (60'') including the insertion element representation (42''') with the different markings (78) is displayed. Markings can for example include alternating ring-like structures (78) with alternating lighter and darker colors and/or different colors
(Continued)

for the tip and the rest of the insertion element representation for improving 3D visualization of insertion elements.

17 Claims, 5 Drawing Sheets

(56) References Cited

U.S. PATENT DOCUMENTS

| | | | | |
|---|---|---|---|---|
| 2011/0237935 A1* | 9/2011 | Kalpin | ............... | A61B 34/20 |
| | | | | 600/424 |
| 2015/0223902 A1 | 8/2015 | Walker | | |
| 2017/0151027 A1 | 6/2017 | Walker | | |
| 2017/0281293 A1 | 10/2017 | Verstege | | |
| 2020/0129239 A1* | 4/2020 | Bianchi | ............. | G06T 19/006 |

FOREIGN PATENT DOCUMENTS

| | | |
|---|---|---|
| WO | 2015/177012 | 11/2015 |
| WO | 2018178248 A1 | 10/2018 |

* cited by examiner

ASSISTING IN MOVING AN INSERTION ELEMENT WITHIN AN OBJECT

CROSS REFERENCE TO RELATED APPLICATIONS

This application is the U.S. National Phase application under 35 U.S.C. § 371 of International Application No. PCT/EP2020/051141 filed Jan. 17, 2020, which claims the benefit of European Patent Application Number 19152842.1 filed Jan. 21, 2019. These applications are hereby incorporated by reference herein.

FIELD OF THE INVENTION

The invention relates to an assisting apparatus for assisting a user in moving an insertion element within an object, a method for assisting a user in moving an insertion element within an object, and a computer program product for assisting a user for moving an insertion element within an object. The invention relates further to an interventional system for moving the insertion element within the object, which comprises the assisting apparatus.

BACKGROUND OF THE INVENTION

In catheterization procedures it is important to know the position of a catheter within an inner structure of a person, through which the catheter should be navigated. For this reason generally a realtime x-ray projection image is generated during the catheterization procedure, wherein a physician moves the catheter within the inner structure based on the generated x-ray projection image. However, since the x-ray projection image is a two-dimensional (2D) image only, it is difficult for the physician to accurately grasp the three-dimensional (3D) position of the catheter within the inner structure and hence to accurately navigate the catheter tip within the inner structure.

WO 2015/177012 A2 discloses an imaging apparatus for imaging a first object like a tip of a catheter within a second object being, for instance, a vascular structure of a person. A three-dimensional representation of the second object including a representation of a surface of the second object and the position of the first object relative to the position of the second object are provided, and a projection of the first object onto the representation of the surface of the second object is determined and shown to a user like a physician on a display.

SUMMARY OF THE INVENTION

It is an object of the present invention to provide an assisting apparatus for assisting a user in moving an insertion element within an object, a method for assisting a user in moving an insertion element within an object, and a computer program product for assisting a user for moving an insertion element within an object, which allows a user to more accurately and faster move the insertion element within the object. It is a further object of the present invention to provide an interventional system for more accurately and faster moving the insertion element within the object, which comprises the assisting apparatus. In a first aspect of the present invention an assisting apparatus for assisting a user in moving an insertion element within an object is presented. The assisting apparatus comprises a tracking unit, an insertion element representation generating unit, and a display. The tracking unit is configured for tracking a 3D position and 3D local shape of the insertion element within the object. The insertion element representation generating unit is configured for generating an insertion element representation representing the insertion element within the object in its 3D position and 3D local shape based on the tracked 3D position and tracked 3D local shape of the insertion element. The insertion element representation generating unit is further configured for providing at least two different markings applied along the length of the insertion element representing indications of the local shape of the insertion element. The display is configured for displaying a display image including the insertion element representation with the at least two different markings applied along the length of the insertion element representation.

Since the insertion element representation generating unit is configured for providing at least two different markings applied along the length of the insertion element representation representing indications of the local shape of the insertion element a visualization can be provided, which allows the user to easily and accurately grasp the 3D shape of the insertion element and hence can allow to more accurately and faster move the insertion element within the object. In particular, this allows an improved visualization compared to shadow effects that are not very pronounced for insertion elements, such as catheters and guidewires, which typically have a longitudinal shape.

The markings can include different colors, different opacity, different brightness, different shadings, or any other type of marking.

The markings can be ring-like structures with a deformed shape. For example, the ring-like structures can be applied along the length of the insertion element representation in form of alternating lighter and darker colors, lower and higher brightness, lower and higher opacity or the like. The deformed shape of the ring-like structure depends on the local shape of the insertion element. This allows to improve the visualization of the local shape of the insertion element.

The insertion element representation generating unit can be configured for providing the at least two markings as ring-like structures with deformed shapes. The deformed shapes can be such that the ring-like structures appear closer on the inner side of a bend and more separated on the outside of the bend for a bend of the local shape of the insertion element in order to emphasize the three-dimensionality effect of the shapes of the ring-like structures. Alternatively or additionally the insertion element representation generating unit can be configured for providing the ring-like structures with a twisting effect for a twist of the local shape of the insertion element. Providing the markings as ring-like structures with deformed shapes allows to improve the 3D visualization of the insertion element within the object.

The assisting apparatus can comprise an object image providing unit for providing an object image showing a view within the object. The tracking unit can be adapted to track an orientation of the insertion element. The insertion element representation generating unit can be configured for generating the insertion element representation with a 3D position, orientation, and size based on the object image. The display can be configured for displaying the display image including the insertion element representation with the at least two different markings applied along the length of the insertion element representation arranged within the object image.

The object image providing unit can include an image acquisition unit for acquiring object images or can be connected to an image acquisition unit for receiving object images acquired by the image acquisition unit. The image acquisition unit can include a computed tomography (CT) system, a magnetic resonance imaging (MM) system, an ultrasound (US) system, a nuclear imaging system like a positron emission tomography (PET) system or a single photon emission tomography imaging system, or any other image acquisition unit for acquiring object images. The object images can be 3D images, 2D projection images, or any other type of image. The object images can be CT images, magnetic resonance (MR) images, PET images, US images, or any other type of image acquired using another type of image acquisition unit. The object image providing unit can include a storing unit for storing object images, e.g., a computer readable medium in form of a memory. The object image providing unit can also include a receiving unit for receiving the object image and for providing the received object image. The object image providing unit can also be adapted to provide a 3D model of the view within the object as an object representation based on the object image. For example, at least surfaces within the object can be segmented in the object image, in order to determine an object surface representation of the surfaces within the object. The object image providing unit can be adapted to provide a polygon mesh representing the view within the object as the object representation. Moreover, the object image providing unit can be adapted to generate the object representation.

The tracking unit can be adapted to track and provide the orientation of a tip of the insertion element relative to a target element within the object, e.g., a point to which the tip is to be moved. The target element can be selected by the user or automatically identified. For instance, the position of the tip may be defined as being the most distal position of a center point at the tip of the insertion element, wherein the tip may be longish, i.e. extended along a longitudinal axis, and wherein the orientation of the tip may be defined as being the orientation of the longitudinal axis of the tip. Considering also the orientation of the tip of the insertion element relative to the target element within the object further improves the 3D impression which can be provided to the user moving the insertion element within the object.

The tracking unit and the object image providing unit can be registered with respect to each other. The registration can be performed in several ways, such as 2D-3D registration. The tracking unit can be registered with the object image providing unit by identifying the position of the insertion element in the object image and by also determining this position by the tracking unit. The insertion element representation generating unit can be configured for generating the insertion element representation with a 3D position, orientation, and size based on the object image. Alternatively, the object image providing unit can be configured for providing the object image showing a view within the object that depends on the tracked orientation of the insertion element. This allows to visualize the shape and orientation of the insertion element within the object.

The tracking unit can be adapted to track the position of the insertion element or for example the tip of the insertion element, relative to the position of the target element within the object, e.g., the point to which the tip is to be moved. The tracking unit can be adapted to provide the position of the tip of the insertion element relative to the position of the target element by using optical shape sensing and/or by using electromagnetic sensors and/or by using x-rays. For instance, the tracking unit can be adapted to acquire x-ray projection images of the insertion element within the object in at least two different acquisition directions, wherein the tip of the insertion element can be identified in the x-ray projection images and the position of the tip of the insertion element relative to the target element within the object can be determined based on the position of the identified tip of the insertion element within the x-ray projection images under consideration of the respective acquisition directions. The determination of the position of the tip of the insertion element can be registered with the object image, in order to provide the position of the tip of the insertion element relative to the position of the target element within the object. For instance, the x-ray projection images, which may be used for determining the position of the tip of the insertion element, can be registered with the object image in which the target element is shown within the object, in order to register the determined position of the insertion element with the object image in which the position of the target element within the object is provided. Or, if optical shape sensing and/or electromagnetic sensing are used for determining the position of the tip of the insertion element relative to the target element of the object, an optical shape sensing system and/or an electromagnetic sensing system can be registered with the object image in which the target element is shown within the object, in order to determine the position of the tip of the insertion element relative to the position of the target element within the object.

The tracking unit can be adapted to calculate a distance between the provided position of the tip of the insertion element and the target element within the object. The calculated distances are preferentially the respective minimal distances.

The object image providing unit can be adapted to generate the object image after the insertion element has been introduced into the object, and to provide the generated object image. The object image can be a live image showing the target element within the object and the tip of the insertion element within the object. The object image can, for instance, be an x-ray projection image which is generated by an x-ray projection system like an x-ray C-arm system. This allows to increase the amount of 3D information, which a user may grasp from the resulting features shown on the display, which may allow the user to further improve the accuracy of moving the insertion element within the object.

The display can be configured for displaying an orientation information of the insertion element relative to the object based on the view within the object, the tracked 3D position, and the tracked orientation of the insertion element within the object. The orientation information can include a sketch of the object in the respective orientation, a sketch of a patient that includes the object in the respective orientation, and/or angles in dependence of a reference coordinate system. This allows to improve the visualization of a current arrangement of the insertion element within the object. The orientation information can for example also indicate the acquisition direction of the view within the object in order to allow the user to better grasp the orientation of the insertion element relative to the object. The object image providing unit can be configured for providing at least two object images with different views within the object. The display can be configured for displaying at least two display images. The display can be configured for displaying the two or more display images simultaneously, e.g., side by side, overlapping with each other, one for each eye of the user or in any other manner. Each of the display images can include the insertion element representation with the at least two different markings applied along the length of the insertion element representation arranged within one of the object images. The different views within the object can for example include different 2D projection images, different slices of a 3D image, or different perspectives of a 3D image. This allows to provide different perspectives of the insertion element within the object at the same time for improving the visualization of the current arrangement of the insertion element within the object.

One marking of the at least two different markings can be applied at a tip of the insertion element representation. The marking applied at the tip can be different from markings applied along the rest of the length of the insertion element representation in order to allow the user to identify the orientation of the tip of the insertion element representation. The marking at the tip can for example be a color, such that the color at the tip is different to the colors applied along the rest of the length of the insertion element representation. The color at the tip can for example be white or black or any color contrasting the color of the background of the insertion element representation, such that the tip can be clearly identified. This allows to improve the identification of the orientation of the tip. Applying a different marking at the tip that is different from markings applied along the rest of the length of the insertion element representation can be combined with other markings, such as applying alternating ring-like structures along the rest of the length of the insertion element. The insertion element can include an optical fiber, catheter, and/or a guidewire, i.e. the assisting apparatus can include an optical fiber, a catheter, a guidewire, or any combination of an optical fiber, catheter and guidewire. The assisting apparatus can also include more than one optical fibers, catheters and guidewires or any combination of them.

The tracking unit can be configured to track the 3D position, and 3D local shape of the insertion element by using optical shape sensing. The tracking unit can also be configured to track the 3D position, 3D local shape, and orientation of the insertion element by using optical shape sensing. The optical shape sensing can be based on optical frequency domain reflectometry (OFDR). OFDR can be used for extracting high density strain measurements from multiple cores in the insertion element, e.g., in an optical fiber included in the insertion element. The strain measurement can be based on light reflected back from continuously-written Fiber Bragg Gratings (FBGs) or from Rayleight Scatter signatures inherent in the optical fiber. The optical fiber can for example include a center core and three outer cores and local shape and position sensing can be performed through axial twist and curvature measurement along the length of the optical fiber. Alternatively or additionally, the tracking unit can be configured for tracking the 3D position, 3D local shape, and/or orientation of the insertion element by any other tracking method. The other tracking methods can include the tracking method and tracking system as described in U.S. Pat. No. 7,772,541 B2 and U.S. Pat. No. 8,116,601 B2.

The tracking unit can be configured for providing parameter values for different points along the length of the insertion element based on the tracked 3D position and 3D local shape of the insertion element. The insertion element representation generating unit can be adapted for calculating for the points along the length of the insertion element visualization values that depend on the parameter values provided by the tracking unit, and for providing the at least two different markings applied along the length of the insertion element representation in dependence of the visualization values. The tracking unit can be configured to calculate 3D positions for the different points along the length of the insertion element based on the points' x-positions, y-positions, and z-positions. The parameter values can include at least one of: twist, strain, and curvature values, i.e., the parameter values can include values of twist, strain, and/or curvature, or other parameters.

The tracking unit can be configured for tracking physical property values of the insertion element, e.g., including temperature values, pressure values, and/or any other kind of physical property values of the insertion element. The insertion element representation generating unit can be configured for providing at least two different overlay markings along the length of the insertion element representation representing indications of the physical property values of the insertion element. The overlay markings can be adapted to be overlayed on the at least two different markings without covering them. The display can be configured for displaying the display image including the insertion element representation with the at least two different markings, and the at least two different overlay markings applied along the length of the insertion element representation. In order for the overlay markings to not cover the markings, the overlay markings can be selected in dependence of the markings. For example, if the markings are colors, the overlay markings can be brightness or shadings. If the markings are brightnesses the overlay markings can for example be colors. The overlay markings can for example be different colors when the markings are ring-like structures with alternating lighter and darker colors, higher and lower opacity, higher and lower brightness, or the like. For example, if the markings along the length of the insertion element representation are ring-like structures with alternating higher and lower brightness, the overlay marking for temperature values can be a color map from red color to green color for high temperature to low temperature. This allows to provide physical property values of the insertion element together with the local shape of the insertion element for improving 3D visualization while providing additional information of the insertion element to the user.

Furthermore the assisting apparatus can comprise a target element providing unit for providing a target representation of a target element within the object to which the insertion element or the tip of the insertion element should be moved. The display can be adapted for displaying the display image including the insertion element representation with the at least two different markings applied along the length of the insertion element representation and the target representation of the target element. The display image can also include the target representation and the insertion element representation with the at least two different markings applied along the length of the insertion element representation arranged within the object image. The target element providing unit can be adapted to automatically select a target element based on commands of a user, e.g., providing a description of the target element for example by naming the target element. Alternatively or additionally the target element providing unit can be adapted to select a target element based on a manual selection of the user, e.g., marking a target element within the object image for example by clicking on it, drawing a frame around it, or the like. Also showing a representation of the target element on the display, to which the insertion element should be moved within the object, can improve the accuracy of moving the insertion element within the object. The target element providing unit can additionally be configured for calculating a pathway of the tip to the target element which avoids other matter and for providing a target pathway representation that represents an indication of the pathway of the tip to the target element which avoids other matter. The display can be configured for also displaying the target pathway. This allows assisting the user in a continuous and guided-interaction as changes of positions of matter within the object result in a recalculation of the target pathway and the user can follow the target pathway for moving the tip of the insertion element to the target element. The target pathway can also be automatically followed by the insertion element, e.g., controlled by robotic means.

An invention in its own right is provided in an assisting apparatus for assisting a user in moving an insertion element within an object in which the assisting apparatus comprises a tracking unit for tracking a 3D position and orientation of the insertion element within the object, an insertion element representation generating unit for generating an insertion element representation representing the insertion element within the object in its 3D position and orientation based on the tracked 3D position and orientation of the insertion element, wherein the insertion element representation generating unit is configured for providing the insertion element representation with at least two different markings, wherein a tip of the insertion element representation is provided with a different marking than any other marking of the insertion element representation, and a display for displaying a display image including the insertion element representation with the tip and its markings. The assisting apparatus can be combined with any aspects presented in the description and the dependent claims. In particular, the insertion element representation with the tip and its markings can be displayed within the object image.

In a further aspect of the present invention an interventional system for moving an insertion element within an object is presented. The interventional system comprises an insertion apparatus including the insertion element, and an assisting apparatus as defined in claim 1 or any embodiment of the assisting apparatus for assisting a user in moving the insertion element within the object.

The insertion apparatus can include a handpiece connected to the insertion element for controlling the insertion element. The insertion element can include one or more optical fibers, guidewires, catheters, and/or sensors. The handpiece can include a user interface for receiving commands of the user. The handpiece can additionally or alternatively include a data processing unit for processing data, e.g., sensor data, such as temperature or pressure data. The sensor data can for example be received from sensors included in the insertion element. The handpiece can be connected to the assisting apparatus for exchanging data.

The insertion apparatus can be configured to move the insertion element, e.g., a catheter within the object, e.g., a heart or vascular structure of a person or an animal. The insertion element can include a tip at its distal end, such as a tip of the catheter or a needle. The insertion apparatus can be adapted to allow a user like a physician to manually move the insertion element within the object. For instance, the insertion apparatus can comprise guidewires, steering wires, et cetera for allowing the user to move the insertion element within the object. The insertion apparatus can also comprise robotic means which can allow the user to move the insertion element within the object by using the handpiece, e.g., a joystick or another input unit of the user interface, for inputting steering commands into the robotic system. The insertion element can also be automatically moved by the robotic means based on the calculated pathway of the tip to the target element which avoids other matter. In another aspect of the present invention a method for assisting a user in moving an insertion element within an object is presented. The method comprises:

tracking a 3D position and 3D local shape of the insertion element within the object by a tracking unit, generating an insertion element representation representing the insertion element within the object in its 3D position and 3D local shape based on the tracked 3D position and tracked 3D local shape of the insertion element by an insertion element representation generating unit, providing at least two different markings applied along the length of the insertion element representation representing indications of the local shape of the insertion element by the insertion element representation generating unit, and displaying a display image including the insertion element representation with the at least two different markings applied along the length of the insertion element representation by a display.

The markings can include different colors, different opacity, different brightness, different shadings, or any other type of marking.

The markings can be ring-like structures with a deformed shape. For example, the ring-like structures can be applied along the length of the insertion element representation in form of alternating lighter and darker colors, lower and higher brightness, lower and higher opacity or the like. The deformed shape of the ring-like structure depends on the local shape of the insertion element. This allows to improve the visualization of the local shape of the insertion element.

The method can include a step of tracking an orientation of the insertion element within the object. The method can comprise a step of providing an object image showing a view within the object by an object image providing unit. The method can include a step of generating the insertion element representation representing the insertion element within the object in its 3D position, 3D local shape, its orientation, and size based on the tracked 3D position, tracked 3D local shape, and tracked orientation of the insertion element and in its size based on the object image by an insertion element representation generating unit. The method can include a step of displaying a display image including the insertion element representation with the at least two different markings applied along the length of the insertion element representation by a display within the object image. This allows to provide an improved 3D visualization.

One marking of the at least two different markings can be applied at a tip of the insertion element representation. The marking applied at the tip can be different from markings applied along the rest of the length of the insertion element representation in order to allow the user to identify the orientation of the tip of the insertion element. The marking at the tip can for example be a color, such that the color at the tip is different to the colors applied along the rest of the length of the insertion element representation. The color at the tip can for example be white or black or any color contrasting the color of the background of the insertion element representation, such that the tip can be clearly identified. This allows to improve the identification of the orientation of the tip. Applying a different marking at the tip that is different from markings applied along the rest of the length of the insertion element representation can be combined with other markings, such as applying alternating ring-like structures along the rest of the length of the insertion element.

An invention in its own right is provided in a method for assisting a user in moving an insertion element within an object in which the method comprises:

tracking a 3D position and orientation of the insertion element within the object by a tracking unit, generating an insertion element representation representing the insertion element within the object in its 3D position and orientation based on the tracked 3D position and orientation of the insertion element by an insertion element representation generating unit, providing the insertion element representation with at least two different markings, wherein a tip of the insertion element representation is provided with a different marking than any other marking of the insertion element representation, and displaying a display image including the insertion element representation with the tip and its markings. The method can be combined with any aspects presented in the description and the dependent claims. In particular, the insertion element representation with the tip and its markings can be displayed within the object image.

In a further aspect of the present invention a computer program product for assisting a user in moving an insertion element within an object is presented. The computer program product comprises program code means for causing an assisting apparatus as defined in claim 1 or any embodiment of the assisting apparatus to carry out the steps of the method as defined in claim 13 or any embodiment of the method, when the computer program product is run on the assisting apparatus.

In a further aspect of the present invention a computer readable medium having stored the computer program product of claim 14 or any embodiment of the computer program product is presented.

It shall be understood that the assisting apparatus of claim 1, the interventional system of claim 12, the method of claim 13, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
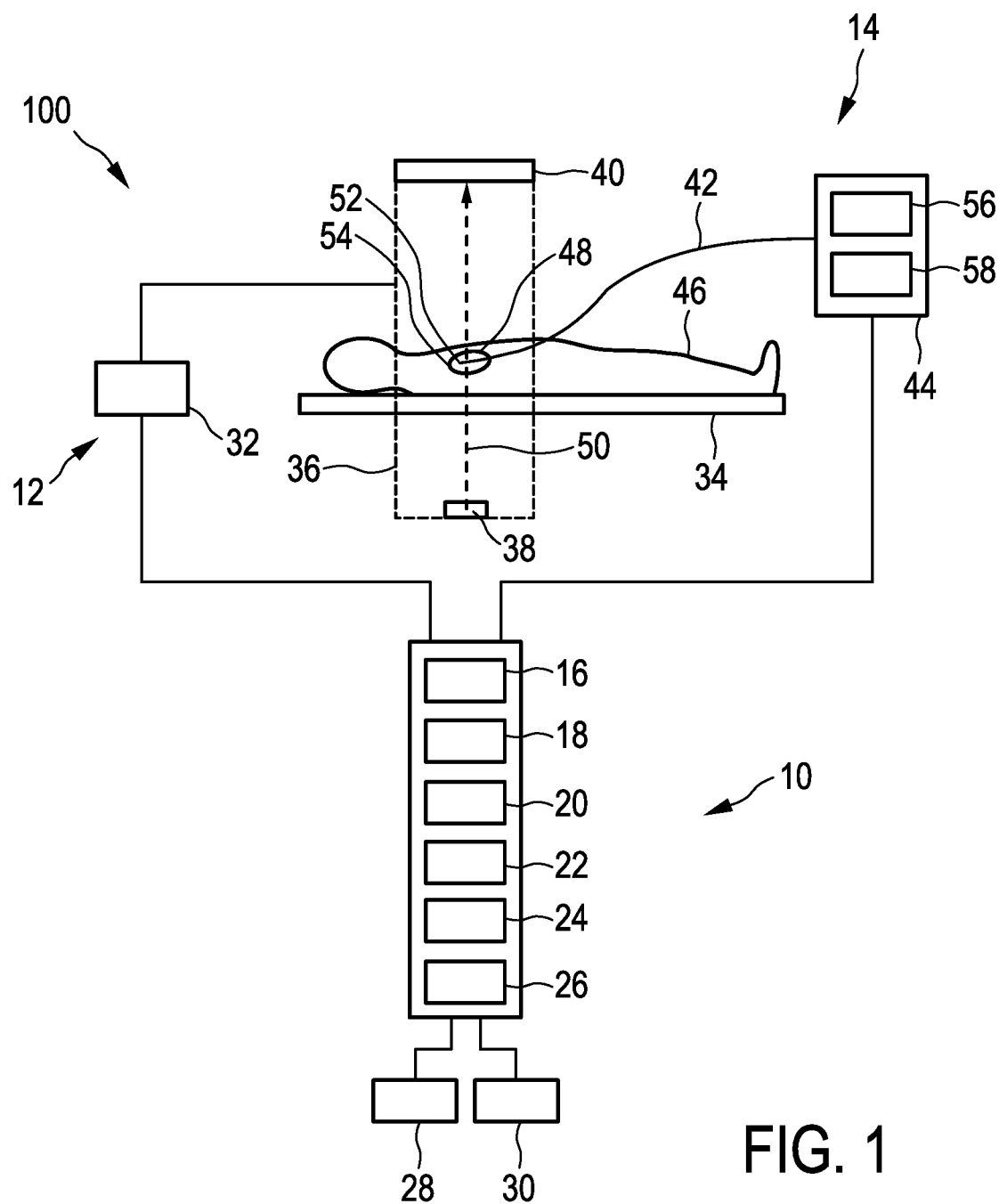
FIG. 1 shows schematically and exemplarily an embodiment of an interventional system for moving a tip of a catheter within a vascular structure, which includes an assisting apparatus for assisting a user in moving the tip of the catheter within the vascular structure.

FIG. 1 shows schematically and exemplarily an embodiment of an interventional system 100 including an assisting apparatus 10, an image acquisition unit 12, and an insertion apparatus 14.

The assisting apparatus 10 includes an object image providing unit 16, a tracking unit 18, an insertion element representation generating unit 20, a target element providing unit 22, a computer readable medium in form of a memory 24, a transceiver 26, a display 28, and a user interface in form of an input unit 30.

The image acquisition unit 12 includes a control unit 32, a support means in form of a table 34, a C-arm 36, an x-ray source in form of x-ray tube 38, and x-ray detector 40. The x-ray tube 38 and the x-ray detector 40 are mounted on opposite sides of the C-arm 36, which is movable with respect to the table 34 in order to allow the image acquisition unit 12 to acquire 2D projection images in different acquisition directions. The control unit 32 controls the image acquisition unit 12, such that it can acquire object images based on the projection images in different acquisition directions. In this embodiment the object images are 2D images. The object images can also for example be 3D images or slices of 3D images.

The insertion apparatus 14 includes an insertion element 42 including a catheter, a guidewire and an optical fiber. In this embodiment the guidewire and the optical fiber are included in the catheter. In other embodiments, the insertion element can include one or more catheters, guidewires and/or optical fibers. The insertion apparatus 14, furthermore, includes a handpiece 44 with a user interface 56 and a data processing unit 58. The handpiece 44 allows the user to directly manipulate the insertion element 42 or to manipulate the insertion element 42 via the user interface 56. The insertion element 42 is moved using the guidewire (not shown). In other embodiments the insertion element can include one or more sensors for measuring one or more physical property values, such as temperature values or pressure values along the length of the insertion element. The sensor data can be acquired by the data processing unit 58 and provided to the tracking unit 18 of the assisting apparatus 10 in form of physical property values.

A patient 46 is placed on the table 34 and the C-arm 36 is moved, such that the image acquisition unit 12 can acquire an object image showing a view within an object in form of a vascular structure 48 of the patient 46 by emitting x-rays 50 that traverse the vascular structure 48 of the patient 46 and that are detected by the x-ray detector 40. The insertion element 42 is inserted in the vascular structure 48 for moving a tip 52 of the insertion element 42 to a target element 54 within the vascular structure 48. The target element 54 is manually selected by the user using the user interface 56. In other embodiments, the target element can also be automatically detected and selected in the object image as target element based on a procedure that is meant to be performed by using the insertion element within an object.

The assisting apparatus 10 can be used for assisting the user in moving the insertion element 42 within the vascular structure 48 by providing a better visualization that allows a faster and more accurate movement of the insertion element 42 within the vascular structure 48.

The object image providing unit 16 is connected to the control unit 32 of the image acquisition unit 12 and receives object images from the image acquisition unit 12. The object image providing unit 16 provides the object images showing a view within the vascular structure 48. In this embodiment the object image providing unit 16 receives the object images and provides them to the other units of the assisting apparatus 10. In other embodiments, the object image providing unit 16 can also be connected to another type of image acquisition unit or include an image acquisition unit, such as a CT system, an MRI system, a US system, a nuclear imaging system like a PET system or a single photon emission tomography imaging system, or any other image acquisition unit for acquiring object images. The object images generated by other types of image acquisition units can include CT images, MR images, PET images, US images, or any other type of image acquired using another type of image acquisition unit.

The tracking unit 18 is connected to the insertion apparatus 44 and tracks a 3D position, 3D local shape, and orientation of the insertion element 42 within the vascular structure 48 based on optical shape sensing. The insertion element 42 comprises an optical fiber with multiple cores, in this embodiment one center core and three outer cores (not shown), that provide strain measurement data that allows the tracking unit 18 to determine the 3D position, the 3D local shape, and the orientation of the catheter 42 by optical shape sensing. The optical shape sensing may be performed in accordance with the description in U.S. Pat. No. 7,772,541 B2, U.S. Pat. No. 8,116,601 B2 or in accordance with another known optical shape sensing technique. In other embodiments the assisting apparatus can also track the 3D position, and 3D local shape of the insertion element by using optical shape sensing. The tracking unit 18 is registered with the object image providing unit 16 by identifying the position of the insertion element 42 in the object images and by also determining this position by the tracking unit 18. In other embodiments, the tracking unit 18 and the object image providing unit 16 can also be registered in any other manner.

The insertion element representation generating unit 20 generates an insertion element representation representing the insertion element 42 within the vascular structure 48 in its 3D position, 3D local shape, orientation, and size based on the object image and the tracked 3D position, tracked 3D local shape, and tracked orientation of the insertion element 42. In this embodiment the tracking unit 18 provides parameter values for different points along the length of the insertion element 42 based on the tracked 3D position, tracked local shape, and tracked orientation of the insertion element 42. The insertion element representation generating unit 20 calculates for the points along the length of the insertion element 42 visualization values that depend on the parameter values for the points along the length of the insertion element 42. The parameter values include twist, strain, and curvature determined by optical shape sensing. In other embodiments the parameter values can include one or more of twist, strain, and curvature. The insertion element representation generating unit 20 provides different markings applied along the length of the insertion element representation in form of different colors representing indications of the local shape of the insertion element in dependence of the visualization values. In this embodiment the tip 52 is white and has a different color compared to another color applied along the length of the insertion element representation. In other embodiments the insertion element representation generating unit can provide different markings in form of ring-like structures with deformed shapes representing indications of the local shape of the insertion element in dependence of the visualization values. The ring-like structures can for example be alternating ring-like structures of higher brightness and lower brightness or the like. The insertion element representation generating unit can provide the deformed shapes of the ring-like structures such that the ring-like structures appear closer on the inner side of a bend and more separated on the outside of the bend for a bend of the local shape of the insertion element in order to emphasize the three-dimensionality effect of the shape of the ring-like structures. Furthermore the insertion element representation generating unit can provide the ring-like structures with a twisting effect for a twist of the local shape of the insertion element.

In other embodiments, instead of colors, other markings can be provided, such as different shadings, different opacities, different brightnesses or the like. In other embodiments, the insertion element representation providing unit can also provide at least two different markings applied along the length of the insertion element representation in dependence of the visualization values. In other embodiments physical property values, such as temperature values and/or pressure values, can be provided by the tracking unit and the insertion element representation providing unit can provide at least two different overlay markings along the length of the insertion element representation representing indications of the physical property values of the insertion element, which are adapted to be overlayed on the at least two different markings without covering them. In order for the overlay markings to not cover the markings, the overlay markings can be selected in dependence of the markings. For example, if the markings are colors, the overlay markings can be brightness or shadings. In yet another embodiment one marking of the at least two different markings can be applied at a tip of the insertion element and the marking applied at the tip can be different from markings applied along the rest of the length of the insertion element representation in order to allow the user to identify the orientation of the tip of the insertion element.

The display 28 displays a display image including the insertion element representation with the different colors applied along the length of the insertion element representation within the object image, i.e., the white tip and the rest of the length of the insertion element 42 with another color. This allows to provide additional information to the user and to assist the user in moving the insertion element 42 within the vascular structure 48, e.g. for moving the tip 52 to the target element 54. Alternatively or additionally, the display can display the insertion element representation with the ring-like structures with deformed shapes along the length of the insertion element representation. Additionally overlay markings can be displayed along the length of the insertion element representation. In other embodiments the display can also display orientation information of the catheter relative to the vascular structure and/or of the tip of the catheter relative to the target element.

The target element providing unit 22 can provide a target representation of the target element 54 within the vascular structure 48 to which the tip 52 of the insertion element 42 is to be moved. The target element providing unit 22 can additionally calculate a pathway of the tip 52 to the target element 54 which avoids other matter and provide a target pathway representation that represents an indication of the pathway of the tip 52 to the target element 54 which avoids other matter. The display 28 can display the target representation representing the target element 54 and/or the target pathway representation. For instance, the display 28 can virtually project the target representation and the insertion element representation with the markings onto the object image under consideration of the image acquisition geometry used for generating the object image in order to visualize the 3D spatial relation between the target element 54 and the tip 52 of the insertion element 42 on the object image.

The memory 24 stores a computer program product for assisting the user in moving the insertion element 42 within the vascular structure 48. The computer program product comprises program code means for causing the assisting apparatus 10 to carry out the steps of a method for assisting the user in moving the insertion element 42 within the vascular structure 48, e.g. the method as presented in FIG. 5, when the computer program product is run on the assisting apparatus 10. The memory 24 can additionally store other data, such as object images and settings for the display.

The transceiver 26 allows transmitting and receiving data. The transceiver 26 can be connected to a clinical information system in order to exchange data (not shown). Alternatively or additionally the transceiver can connect the interventional system with the internet.

The input unit 30 can be used by the user to input commands like a start command for starting the assisting procedure or a stop command for stopping the assisting procedure. The input unit 30 may be a keyboard, a computer mouse, a touch screen, et cetera.

Figure 2:
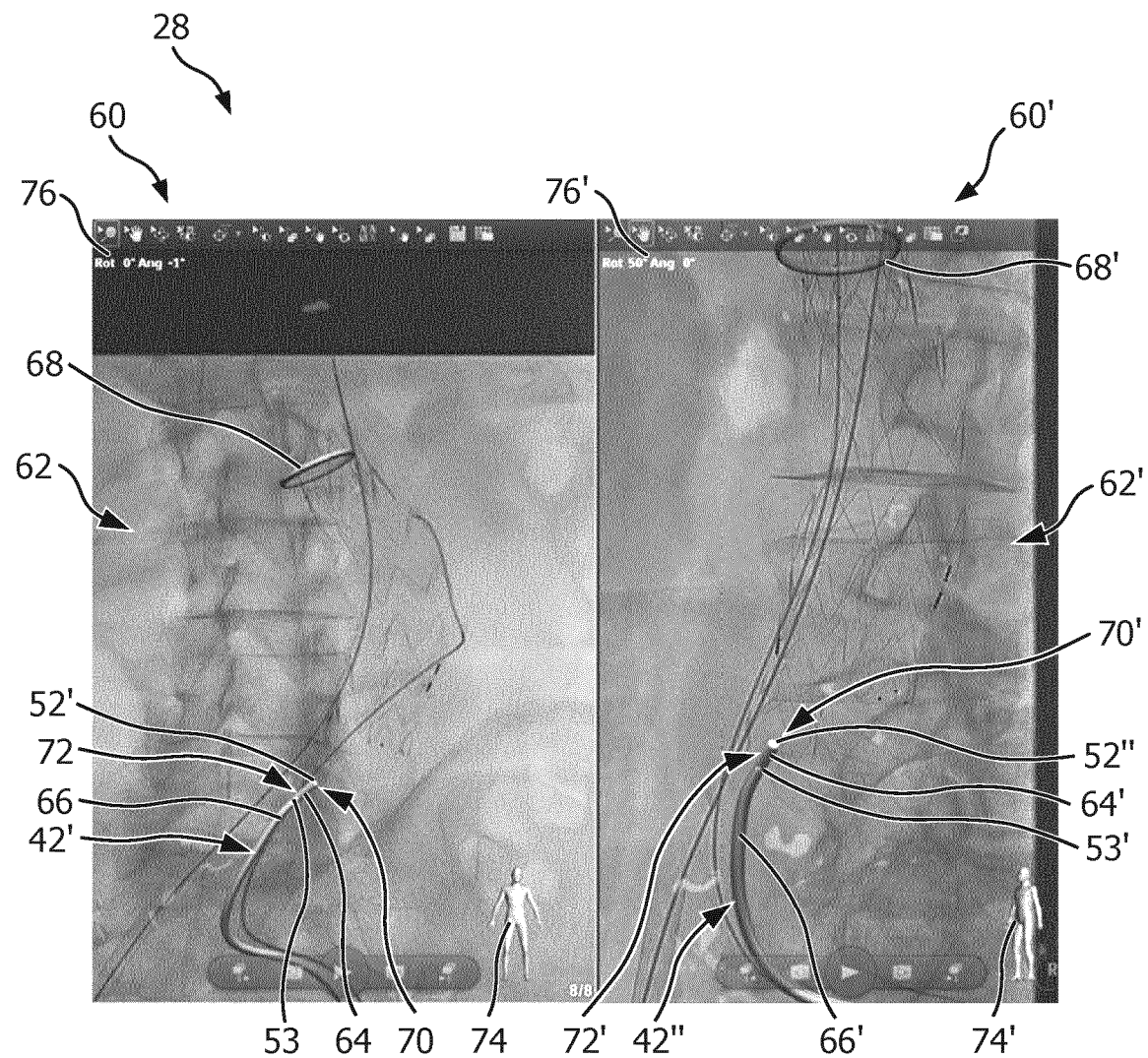
FIG. 2 shows schematically and exemplarily a display of the assisting apparatus for displaying two display images.

FIG. 2 shows schematically and exemplarily a display 28 of an assisting apparatus, e.g. the assisting apparatus 10 as presented in FIG. 1, for displaying two display images 60 and 60'. In this embodiment the object image providing unit provided two object images 62 and 62' with different views within the vascular structure. The display 28 displays the two display images 60 and 60' side by side, such that the user can see two different perspectives within the vascular structure.

Display image 60 shows an insertion element representation 42' including a catheter representation 64 and a guidewire representation 66 within the catheter representation 64, both within the object image 62. Furthermore, a target representation 68 is placed at the height of a lowest renal of the patient within the object image 62. The insertion element enters the body of the patient via the right Iliac. An endovascular aneurysm repair (EVAR) device is placed in the abdominal aorta below the renal arteries. Display image 60' respectively shows another perspective, with an insertion element representation 42" including a catheter representation 64' and a guidewire representation 66' within the catheter representation 64', both within the object image 62'. A target representation 68' is placed at the height of the lowest renal, i.e., at the target element.

In this embodiment, a different color is applied to the tips 52' and 52" of the catheter representations 64' and 64" compared to the rest of the length of the catheter representations 64' and 64". The tips 52' and 52" are of white color 70 and 70' in order to improve the identification of the orientation of the tips 52' and 52". In particular, this allows to better identify whether the tips 52' and 52" are pointing towards or away from the viewing angle. Another color 72 and 72' is applied along the rest of the length of the catheter representations 64' and 64". This allows to better identify the local shape of the catheter represented by its catheter representation.

The guidewire is inside of the catheter in this embodiment. The tips 53 and 53' of the guidewire representations 66 and 66' are of another color than the rest of the length of the guidewire representations 66 and 66' in order to improve the identification of the orientation of the tips 53 and 53'.

In this embodiment, the display 28 furthermore displays an orientation information of the insertion element representations 42' and 42" relative to the vascular structure based on the view within the object and the tracked 3D position and tracked 3D orientation of the insertion element within the vascular structure. The orientation information includes a human body representation 74 and 74' rotated around a longitudinal axis with a zero degree position corresponding to a reference system that shows the patient on the table in a front view as seen by the user. Furthermore the orientation information includes a rotation angle representation 76 and 76' that provides the degree to which the view within the object is rotated compared to the reference system. The rotation angle depends on the rotation of the C-arm relative to the patient on the table. In the display image 60, the rotation angle is 0° and an angulation angle is −1°. In the display image 60', the rotation angle is 50° and the angulation angle is 0°. The orientation information allows an improved visualization.

Figure 3:
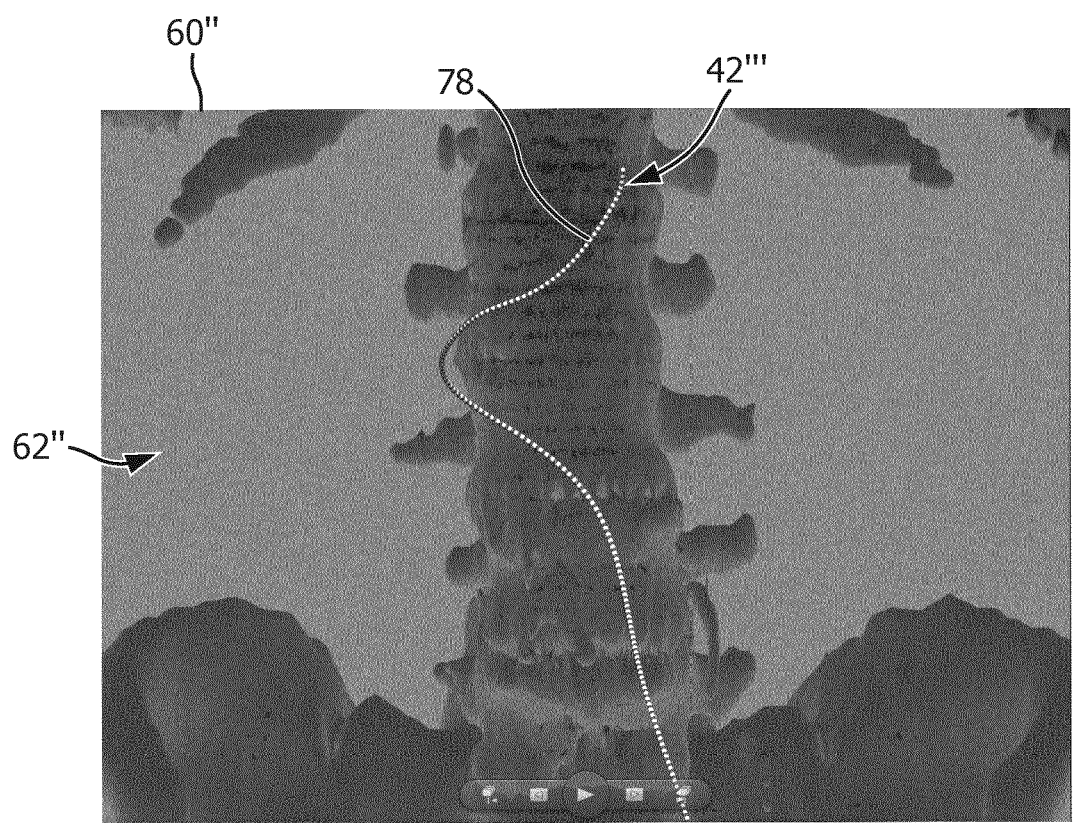
FIG. 3 shows schematically and exemplarily a display image including an insertion element representation with alternating ring-like structures along the length of the insertion element representation.

FIG. 3 shows schematically and exemplarily a display image 60" including an insertion element representation 42''' with alternating ring-like structures 78 with deformed shapes along the length of the insertion element representation 42''' within an object image 62". The ring-like structures 78 alternate in a lighter and darker color along the length of the insertion element representation 42''' in this embodiment. In other embodiments, the ring-like structures can also alternate in brightness, opacity, shading or any other kind of marking. In yet other embodiments overlay markings can be applied along the ring-like structures along the length of the insertion element representation. Additionally, the tip of the insertion element can have a different marking, e.g. color, than the rest of the insertion element representation.

In this embodiment, the ring-like structures have deformed shapes such that the ring-like structures 78 appear closer on the inner side of a bend and more separated on the outside of the bend for a bend of the local shape of the insertion element in order to emphasize the three-dimensionality effect of the shapes of the ring-like structures 78. Furthermore, the ring-like structures 78 show a twisting effect for a twist of the local shape of the insertion element. This allows to improve the visualization of depth and curvature of the elongated structure of the insertion element representation 42".

Figure 4:
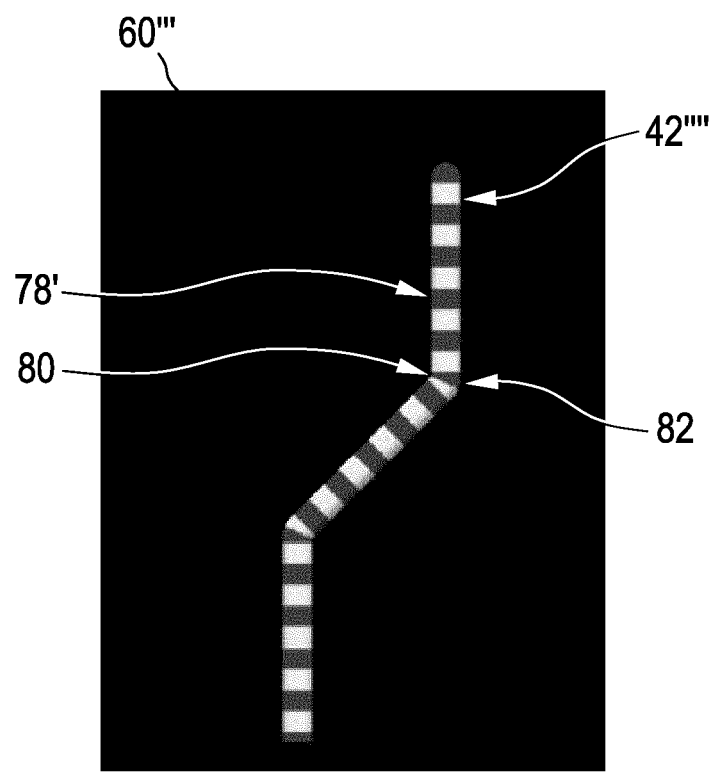
FIG. 4 shows schematically and exemplarily a part of an insertion element representation with alternating ring-like structures along the length of the insertion element representation.

FIG. 4 shows schematically and exemplarily in a display image 60''' a part of an insertion element representation 42'''' with alternating ring-like structures 78' with deformed shapes along the length of the insertion element representation 42''''. The ring-like structures 78', like the ring-like structures 78 presented in the embodiment of FIG. 3, have alternating colors of lighter and darker color. The shapes of the ring-like structures 78' are deformed such that the ring-like structures 78' are closer together on the inside 80 of the curvature and further apart on the outside 82 of the curvature. The difference in the length of the ring-like structures inside of the curvature and outside of the curvature can be perceived as depth and curvature of the insertion element representation 42" " by the user, e.g., like a shower hose. This allows to improve the 3D visualization of the insertion element.

Figure 5:
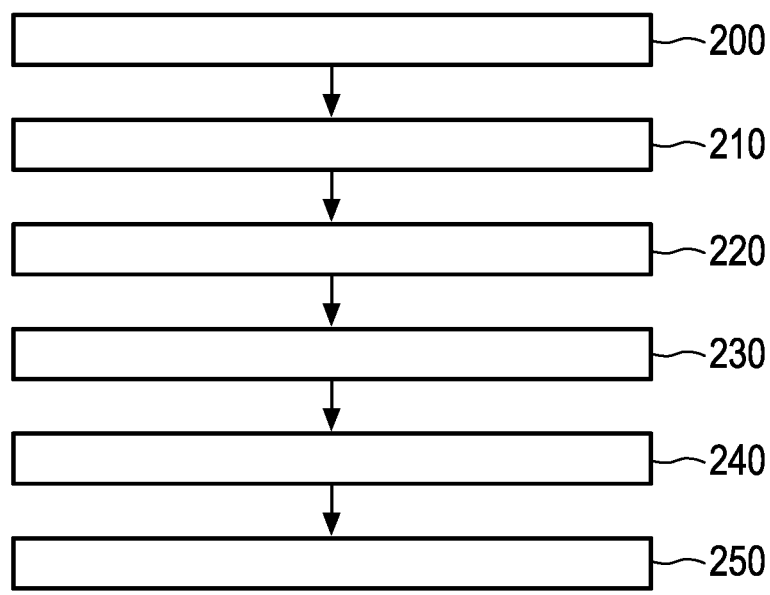
FIG. 5 shows a flowchart exemplarily illustrating an embodiment of a method for assisting a user in moving a catheter within a vascular structure.

FIG. 5 shows a flowchart exemplarily illustrating an embodiment of a method for assisting a user in moving an insertion element in form of a catheter within an object in form of a vascular structure.

In step 200 a 3D position, 3D local shape, and orientation of the catheter within the vascular structure are tracked by a tracking unit. The tracked 3D position, 3D local shape, and orientation of the catheter within the vascular structure can be provided as parameter values by the tracking unit. In other embodiments also only a 3D position and 3D local shape of the insertion element within the object can be tracked by the tracking unit. In yet other embodiments the tracking unit can track physical property values of the insertion element such as temperature values, pressure values, or any other physical property and provide physical property values.

In step 210 object images showing a view within the vascular structure are provided. The catheter is inserted in the vascular structure in this embodiment, such that the object images include the catheter. In this embodiment the object images are 2D projection x-ray images acquired from different acquisition directions. In other embodiments the object images can also be 3D images or any other type of image. The object images can also be CT images, MR images, PET images, US images, or images acquired with any other type of image acquisition unit. Step 210 is optional. Furthermore, step 200 and 210 can be performed in parallel or in exchanged order.

In step 220 the tracking unit and the object image providing unit are registered with respect to each other. The registration can be performed in several ways, such as 2D-3D registration. In this embodiment the tracking unit is registered with the object image providing unit by identifying the position of the catheter in the object image and by also determining this position by the tracking unit. In other embodiments any other method for registering the tracking unit with the object image providing unit can be performed in order to register them. Step 220 is optional. In particular, when step 210 is not performed, no registration is required.

In step 230 an insertion element representation representing the catheter within the vascular structure is generated in its 3D position, 3D local shape, and orientation based on the tracked 3D position, tracked 3D local shape, and orientation of the insertion element and in its size based on the object image by an insertion element representation generating unit. In other embodiments an insertion element representation representing the catheter within the vascular structure can be generated in its 3D position and 3D local shape based on the tracked 3D position and tracked 3D local shape of the insertion element by the insertion element representation generating unit.

In step 240 different markings in form of ring-like structures with alternating brightness and deformed shapes are applied along the length of the insertion element representation representing indications of the local shape of the insertion element are provided by the insertion element representation generating unit, i.e., the brightness of the ring-like structures along the length of the insertion element alternates between lower and higher brightness. Furthermore the tip is provided with white color and the rest of the insertion element representation is provided with another color than white. Furthermore orientation information is provided that includes a human body representation and a rotation angle representation relative to a reference system. The deformed shape of the ring-like structures depends on the local shape of the insertion element. In particular, the deformed shape of the ring-like structures is provided such that it appears closer on the inner side of a bend and more separated on the outside of the bend for a bend of the local shape of the catheter in order to emphasize the three-dimensionality effect of the shapes of the ring-like structures. The deformed shape is furthermore provided with a twisting effect for a twist of the local shape of the catheter. The markings can also include opacity, brightness, shadings, or any other type of markings. In other embodiments at least two different markings applied along the length of the insertion element representation representing indications of the local shape of the insertion element can be provided by the insertion element representation generating unit. Additionally at least two different overlay markings can be provided.

In step 250 two display images are displayed by a display unit. The two display images each show a different perspective within the vascular structure. Each of the display images includes the insertion element representation with the ring-like structures and the different tip color compared to the other color applied along the length of the insertion element representation within the object image. The tip is white in order to allow an improved identification of the orientation of the tip and thus of the orientation of the catheter. Furthermore the orientation information is displayed in each of the display images. In other embodiments also only one display image or more than two display images can be displayed. The display image or display images can also include the insertion element representation with at least two different markings applied along the length of the insertion element representation and optionally two or more overlay markings. In other embodiments the display image can include the insertion element representation with the at least two different markings applied along the length of the insertion element representation within one of the object images and optionally two or more overlay markings.

In one embodiment the insertion element representation has different colors and the tip of the insertion element representation has a different color than the rest of the insertion element representation. The display image including the insertion element representation with the white tip can be displayed within the object image.

In other embodiments of the method, one or more target element can be selected by the user and target representations of the target element can be provided by a target element providing unit and displayed by the display. Additionally target pathway representations can be provided.

Other variations to the disclosed embodiments can be understood and effected by those skilled in the art in practicing the claimed invention, from a study of the drawings, the disclosure, and the appended claims. The invention can for example also be used for assisting a user in moving an insertion element within an object, such as a tube system, e.g. a pneumatic tube system.

In the claims, the words "comprising" and "including" do not exclude other elements or steps, and the indefinite article "a" or "an" does not exclude a plurality. A single unit or device may fulfill the functions of several items recited in the claims. The mere fact that certain measures are recited in mutually different dependent claims does not indicate that a combination of these measures cannot be used to advantage.

Operations like tracking a 3D position and 3D local shape of the insertion element within the object by a tracking unit, generating an insertion element representation representing the insertion element within the object in its 3D position and 3D local shape based on the tracked 3D position and tracked 3D local shape of the insertion element by an insertion element representation generating unit, providing at least two different markings applied along the length of the insertion element representation representing indications of the local shape of the insertion element by the insertion element representation generating unit, displaying a display image including the insertion element representation with the at least two different markings applied along the length of the insertion element representation by a display, et cetera performed by one or several units or devices can also be performed by any other number of units or devices. These operations and/or the control of the assisting apparatus in accordance with the method for assisting a user in moving an insertion element within an object can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to assisting a user in moving an insertion element within an object. A 3D position and 3D local shape of the insertion element are tracked within the object. Based on the tracked 3D position and 3D local shape of the insertion element, an insertion element representation representing the insertion element within the object in its 3D position and 3D local shape is generated. Furthermore at least two different markings applied along the length of the insertion element representation representing indications of the local shape of the insertion element are provided. A display image including the insertion element representation with the different markings is displayed. Markings can for example include alternating ring-like structures with alternating lighter and darker colors and/or different colors for the tip and the rest of the insertion element representation for improving 3D visualization of insertion elements.

The invention claimed is:

1. An apparatus for assisting a user in moving an insertion element comprising a catheter within an object, the assisting apparatus comprising:
 a non-transitory computer readable medium that stores instructions, which when executed by a computer is adapted to: track a three-dimensional position and a three-dimensional local shape of the insertion element within the object; and generate a representation of the insertion element within the object in its three-dimensional position and three-dimensional local shape based on the tracked three-dimensional position and the tracked three-dimensional local shape of the insertion element provide at least two different markings applied along a length of the insertion element representation representing indications of the local shape of the insertion element;
 provide the at least two markings as ring-like structures with deformable shapes in such a way that the ring-like structures with the deformable shapes appear closer on an inner side of a bend and more separated on an outside of the bend for a bend of the local shape of the insertion element such that the deformable shapes of the at least two markings are altered in order to emphasize the three-dimensionality effect of the shapes of the ring-like structures; and
 a display for displaying a display image including the insertion element representation with the at least two different markings applied along the length of the insertion element representation.

2. The assisting apparatus as defined in claim 1, wherein the instructions further cause the computer to provide the at least two markings with a twisting effect for a twist of the local shape of the insertion element.

3. The assisting apparatus as defined in claim 1, wherein the assisting apparatus comprises an imaging system adapted to provide an object image showing a view within the object,
 wherein a tracking unit is adapted to track an orientation of the insertion element within the object,
 wherein the instructions further cause the computer to generate the insertion element representation with three-dimensional position, orientation, and size based on the object image, and
 wherein the display is configured for displaying the display image including the insertion element representation with the at least two different markings applied along the length of the insertion element representation arranged within the object image.

4. The assisting apparatus as defined in claim 3, wherein the display is configured for displaying an orientation information of the insertion element relative to the object based on the view within the object, the tracked three-dimensional position, and the tracked orientation of the insertion element within the object.

5. The assisting apparatus as defined in claim 4, wherein the imaging system is configured to provide at least two object images with different views within the object, and
 wherein the display is configured for displaying at least two display images, wherein each of the display images includes the insertion element representation with the at least two different markings applied along the length of the insertion element representation arranged within one of the object images.

6. The assisting apparatus according to claim 1, wherein one marking of the at least two different markings is applied at a tip of the insertion element representation and wherein the marking applied at the tip is different from markings applied along the rest of the length of the insertion element representation in order to allow the user to identify an orientation of the tip of the insertion element representation.

7. The assisting apparatus as defined in claim 1, wherein a tracking unit is configured to track the three-dimensional position, and three-dimensional local shape of the insertion element by using optical shape sensing.

8. The assisting apparatus as defined in claim 1, further comprising a tracking unit configured for providing parameter values for different points along the length of the insertion element based on the tracked three-dimensional position and three-dimensional local shape of the insertion element, and
 wherein the instructions further cause the computer to:
 calculate for the points along the length of insertion element visualization values that depend on the parameter values provided by the tracking unit, and provide the at least two different markings applied along the length of the insertion element representation in dependence of the visualization values.

9. The assisting apparatus as defined in claim 8, wherein the parameter values include at least one of: twist, strain, and curvature values.

10. The assisting apparatus as defined in claim 1, wherein a tracking unit is configured for tracking physical property values of the insertion element,
 wherein the instructions further cause the computer to provide at least two different overlay markings along the length of the insertion element representation representing indications of the physical property values of the insertion element, which are adapted to be overlayed on the at least two different markings without covering them and wherein the display is configured for displaying the display image including the insertion element representation with the at least two different markings, and the at least two different overlay markings applied along the length of the insertion element representation.

11. An interventional system for moving an insertion element within an object, wherein the interventional system comprises:
an insertion apparatus including the insertion element, and
an apparatus as defined in claim 1 for assisting the user in moving the insertion element within the object.

12. A method for representing an insertion element comprising a catheter within an object as an assistance when the insertion element is moved within the object, the method comprising:
tracking a three-dimensional position and three-dimensional local shape of the insertion element within the object by a tracking unit,
generating an insertion element representation representing the insertion element within the object in its three-dimensional position and three-dimensional local shape based on the tracked three-dimensional position and tracked three-dimensional local shape of the insertion element using a computer,
providing at least two different markings applied along a length of the insertion element representation representing indications of the local shape of the insertion element using the computer,
providing the at least two markings as ring-like structures with deformable shapes in such a way that the ring-like structures with the deformable shapes appear closer on an inner side of a bend and more separated on an outside of the bend for a bend of the local shape of the insertion element such that the deformable shapes of the at least two markings are altered in order to emphasize the three-dimensionality effect of the shapes of the ring-like structures; and
displaying a display image including the insertion element representation with the at least two different markings applied along the length of the insertion element representation by a display.

13. The method of claim 12, further comprising providing the at least two markings with a twisting effect for a twist of the local shape of the insertion element.

14. The method of claim 12, wherein one marking of the at least two different markings is applied at a tip of the insertion element representation and wherein the marking applied at the tip is different from markings applied along the rest of the length of the insertion element representation in order to allow a user to identify an orientation of the tip of the insertion element representation.

15. A non-transitory computer readable program product containing instructions, which when executed by a computer, cause the computer to:
track a three-dimensional position and a three-dimensional local shape of an insertion element within an object by a tracking unit,
generate an insertion element representation representing the insertion element within the object in its three-dimensional position and three-dimensional local shape based on the tracked three-dimensional position and tracked three-dimensional local shape of the insertion element,
provide at least two different markings applied along a length of the insertion element representation representing indications of the local shape of the insertion element by the computer,
provide the at least two markings as ring-like structures with deformable shapes in such a way that the ring-like structures with the deformable shapes appear closer on an inner side of a bend and more separated on an outside of the bend for a bend of the local shape of the insertion element such that the deformable shapes of the at least two markings are altered in order to emphasize the three-dimensionality effect of the shapes of the ring-like structures, and
display an image including the insertion element representation with the at least two different markings applied along the length of the insertion element representation by a display.

16. The non-transitory computer readable program product of claim 15, wherein the instructions further cause the computer to provide the at least two markings with a twisting effect for a twist of the local shape of the insertion element.

17. The non-transitory computer readable program product of claim 15, wherein one marking of the at least two different markings is applied at a tip of the insertion element representation and wherein the marking applied at the tip is different from markings applied along the rest of the length of the insertion element representation in order to allow a user to identify an orientation of the tip of the insertion element representation.

* * * * *